Sept. 6, 1927.  
R. E. MEDER  
1,641,346  
PHOTOGRAPHIC ENLARGING APPARATUS  
Filed May 28, 1926  
2 Sheets-Sheet 2
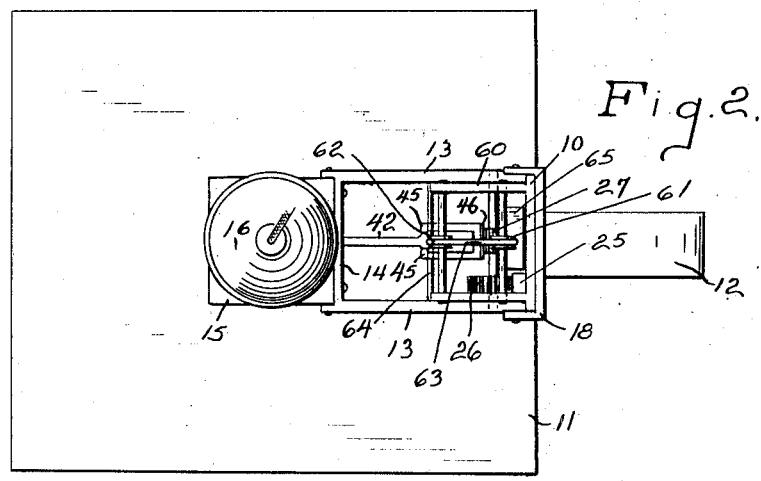
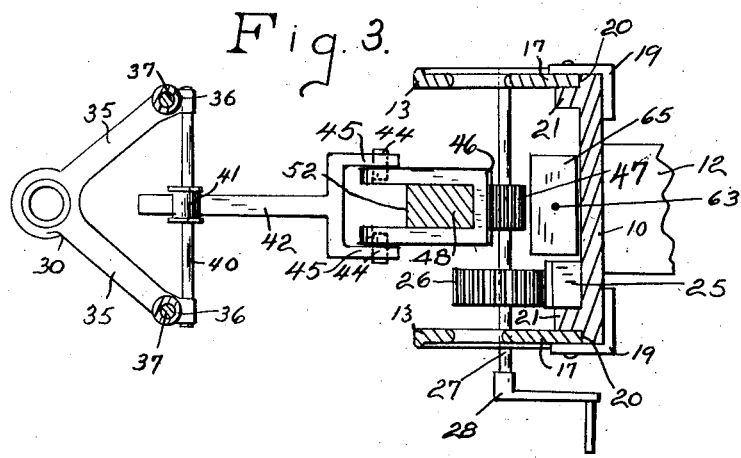
INVENTOR.  
Robert E. Meder  
BY Erwin Wheeler & Woodard  
ATTORNEYS.

Patented Sept. 6, 1927.

1,641,346

UNITED STATES PATENT OFFICE.

ROBERT E. MEDER, OF MILWAUKEE, WISCONSIN.

PHOTOGRAPHIC ENLARGING APPARATUS.

Application filed May 28, 1926. Serial No. 112,233.

This invention relates to improvements in photographic enlarging apparatus.

The object of invention is to provide greater accuracy in the focal adjustments; to provide automatic means for precisely varying the rate of focal adjustment in accordance with the requirements imposed by the distance between the negative and the screen in any given adjustment; to provide convenient means for manipulation and, in general, to devise a simple, inexpensive and efficient apparatus.

In the drawings:

Figure 1 is an elevation of an enlarging apparatus embodying my invention.

Figure 2 is a plan view of the same.

Figure 3 is a cross sectional view drawn generally on line 3—3 of Figure 1.

Like parts are identified by the same reference characters throughout the several views.

A channel shaped standard 10 is mounted upon a suitable base 11 which extends forwardly and serves as a table and support for the screen. The standard is suitably supported at the rear side by a brace 12 which is secured to the base. The projector carriage comprises a frame having bracket shaped side arms 13 connected by a cross bar 14 and arranged to support a holder 15 for the projector 16. The rear portion of the carriage is provided with vertically elongated slide members 17, the upper ends of which are connected by a cross bar 18. The lower end portions have inturned flanges 19 which slide upon the rear side of the standard 10. The side arms 13 are secured to the inner surfaces of the vertically elongated slide members 17 by bolts or rivets and are received in channels or guideways 20 formed in the outer surfaces of the side flanges 21 of the standard 10.

Near one side the standard is provided with a vertically extending rack bar 25, the teeth of which are in mesh with a pinion 26 mounted upon a shaft 27, the ends of which are journalled in the lower portions of the slide members 17. On one side the end of the shaft projects and is provided with an operating crank 28, the rotation of which causes the pinion 26 to travel along the rack bar 25 to raise or lower the carriage, thereby increasing or diminishing the distance between the projector and the screen holder or base 11.

The projector is provided with a lens holder 30 connected with the body of the projector by an ordinary light excluding bellows 31, whereby the lens can be adjusted at varying distances from a negative mounted upon the negative holder indicated at 32. The construction of the projector will be in accordance with ordinary practice and further description or illustration is therefore deemed unnecessary.

For the purposes of the present invention, the lens holder 30 is connected by arms 35 with sleeves 36 mounted to slide upon guide rods 37 depending from the bracket arms 14. The sleeves 36 are connected by a cross rod 40 provided with a central spool 41 and both sleeves are supported upon their respective guide rods 37 by a bell crank having a forwardly projecting arm 42 upon which the spool 41 rests. The bell crank is fulcrumed at 44 to forwardly projecting ears 45 on a rack bar 46, the teeth of which mesh with a pinion 47. The rack bar 46 with its projecting ears 45 and arm 42 constitutes an auxiliary carrier adapted to slide along the inner bar 48 associated with the standard in spaced relation thereto. Pinion 47 is of less diameter than the pinion 26 and therefore when the latter travels downwardly along the rack bar 25, its rotary movement will be transmitted to the pinion 47 to feed rack bar 46 downwardly at a more rapid speed but with the increase proportioned to the relative diameters of the gear wheel and pinion, respectively, thereby extending the bellows 31 and increasing the distance between the lens and the negative in an inverse ratio to the decreasing distance between the projector and the screen holder. The rate of extension as thus determined is constant and the pinion may be of such size as to extend the distance between the lens and the negative as nearly in accordance with the requirements as is possible to be done with a uniform rate of extension. A compensating adjustment may then be made by means of the cam guide now to be described.

The bell crank has a downwardly projecting arm 50 provided with an anti-friction roller 51 which travels upon a cam shaped guide member 52, the bearing surface of which has a contour calculated to progressively swing the bell crank upon its fulcrum pivot 44 to effect an exact adjustment of the lens with reference to the negaholder modified by the movement of the bell crank as directed by said cam surface.

5. Photographic enlarging apparatus, comprising the combination with a screen supporting base, a standard mounted thereon and provided with a rack bar, a projector supporting carriage mounted for sliding movement along the standard and provided with a pinion operatively associated with the rack bar, another pinion adapted to be driven by the first mentioned pinion, a lens holder carrier provided with a rack bar in mesh with said second pinion, a cam track extending along the path of the carrier, and a lever pivotally connected with the carrier and having one arm adapted to be guided by said cam track and another arm connected with the lens holder.

6. Photographic enlarging apparatus, comprising the combination with a screen supporting base, a standard mounted thereon and provided with a rack bar, a projector supporting carriage mounted for sliding movement along the standard and provided with a pinion operatively associated with the rack bar, a guide rod supported from said carriage and having a lens sleeve mounted to slide thereon, a lens holder connected with said sleeve, a lever having one arm in actuating relation to said sleeve and a guiding cam in the path of another arm of said lever for progressively tilting the lever to maintain the lens holder at a proper focusing point during movements of the carriage, an independently movable member mounted upon the carriage in fulcrum bearing relation to said lever, and means for actuating said member relatively to the carriage and in the direction of carriage movement.

7. In a photographic enlarging apparatus, the combination with a projector provided with an adjustable lens holder, a projector supporting carriage, a lens holder positioning member supported from the carriage, means connected with the carriage for operating said positioning member at a greater speed definitely proportional to the carriage movement and in the same direction, and associated means for transmitting a progressively varying movement to the lens holder from said positioning member.

8. Photographic enlarging apparatus comprising the combination with a support, of a projector carriage movably mounted thereon, an auxiliary lens holder carrier, means for actuating the same along said support at a constant speed greater than that of the projector carriage, a lens holder movably supported from the auxiliary carrier, and means for imparting a variable motion to the lens holder, supplemental to the rate of travel of the auxiliary carrier.

9. Photographic enlarging apparatus comprising the combination with a support provided with a trackway, of a projector carriage movably mounted thereon, a projector connected with the carriage and provided with a relatively movable lens holder, another trackway connected with said support, an auxiliary lens holder carrier movably mounted thereon, means for actuating the auxiliary carrier along its trackway at a constant speed different from that of the projector carriage, and means associated with the lens holder carrier and its trackway for imparting a progressively variable motion to the lens holder to relatively retard it during one portion of its carrier movement and accelerating it during the other portion of such movement.

10. Photographic enlarging apparatus comprising the combination with a supporting standard, a projector carriage adapted to travel along said standard, a projector connected with the carriage and provided with a relatively movable lens holder, a lens holder carrier independently movable along said standard, motion transmitting connections for actuating the carriage and carrier at different speeds, and cam actuated motion varying connections between the carrier and lens holder for modifying the movement of the lens holder with reference to the carrier movement.

11. In a photographic enlarging apparatus, the combination with a projector carriage, of a projector connected therewith and provided with relatively movable lens holder, a lens holder carrier, actuating connections for moving the carriage and carrier at different speeds, and speed varying mechanism for transmitting motion from the carrier to the lens holder in a progressively varying proportion to the movements of the carriage and carrier.

Sept. 6, 1927.  H. E. NORVIEL  1,641,352
ELECTRIC SWITCH
Filed Jan. 20, 1926
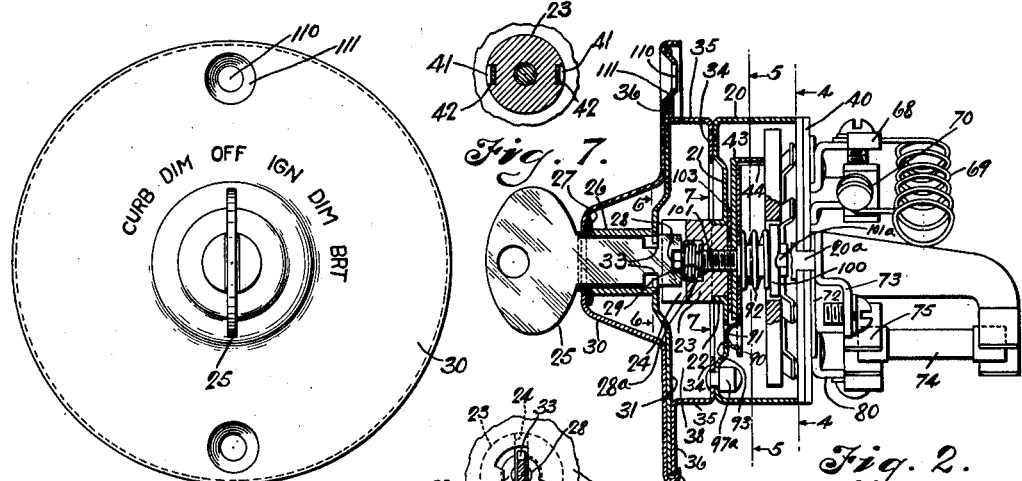
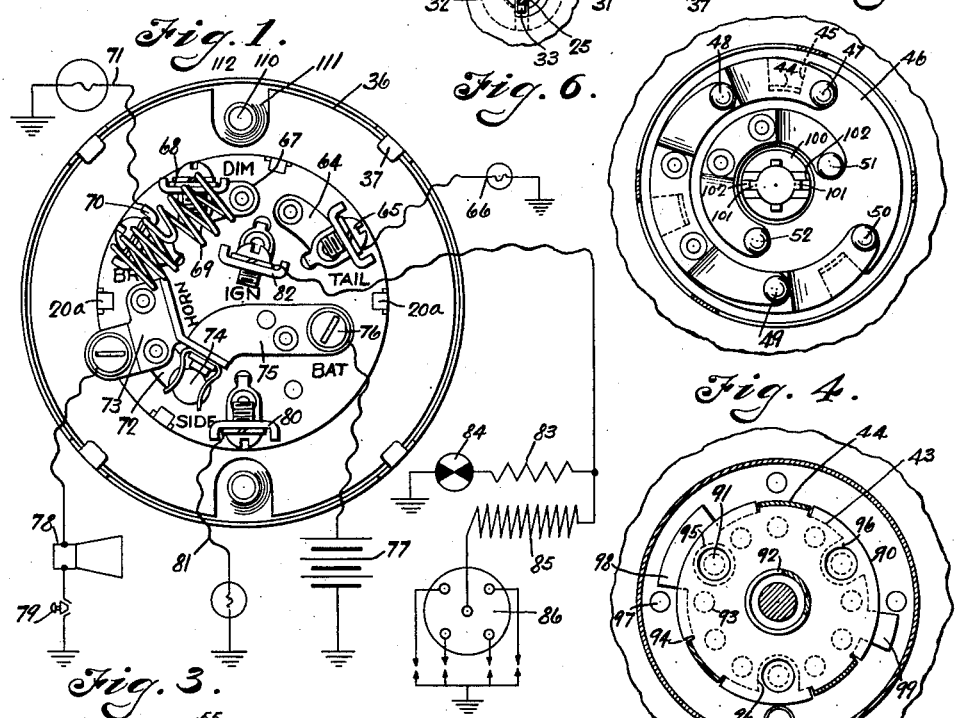
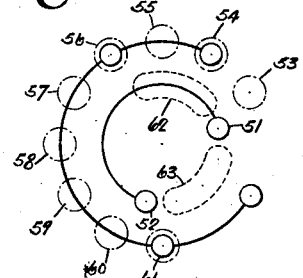

ROBERT E. MEDER.